(12) United States Patent
Nguyen

(10) Patent No.: US 7,496,772 B1
(45) Date of Patent: Feb. 24, 2009

(54) METHOD FOR ESTIMATING TOTAL POWER REQUIREMENT IN A COMPUTER SYSTEM

(75) Inventor: Thoi Nguyen, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/041,669

(22) Filed: Mar. 4, 2008

(51) Int. Cl.
G06F 1/00 (2006.01)
G06F 1/32 (2006.01)
G06F 11/30 (2006.01)

(52) U.S. Cl. .................. 713/300; 713/320; 713/340
(58) Field of Classification Search .......... 713/300, 713/320, 340
See application file for complete search history.

(56) References Cited

U.S. PATENT DOCUMENTS

| | | | |
|---|---|---|---|
| 5,483,656 A | 1/1996 | Oprescu et al. | |
| 5,532,945 A | 7/1996 | Robinson | |
| 5,652,893 A | 7/1997 | Ben-Meir et al. | |
| 5,694,607 A | 12/1997 | Dunstan et al. | |
| 5,842,027 A | 11/1998 | Oprescu et al. | |
| 5,894,579 A | 4/1999 | Fujihara | |
| 5,964,879 A | 10/1999 | Dunstan et al. | |
| 6,308,240 B1 | 10/2001 | De Nicolo | |
| 6,553,500 B1 | 4/2003 | Sterzik et al. | |
| 6,594,771 B1 | 7/2003 | Koerber et al. | |
| 6,618,811 B1 | 9/2003 | Berthaud et al. | |
| 6,625,736 B1 | 9/2003 | Berthaud et al. | |
| 6,804,616 B2 | 10/2004 | Bodas | |
| 6,952,782 B2 | 10/2005 | Staiger et al. | |
| 6,968,470 B2 | 11/2005 | Larson et al. | |
| 6,986,069 B2 * | 1/2006 | Oehler et al. ............... 713/320 |
| 7,155,625 B2 * | 12/2006 | Cohen et al. ............... 713/340 |
| 7,203,852 B2 | 4/2007 | Cohen et al. | |
| 7,337,339 B1 | 2/2008 | Choquette et al. | |
| 2002/0073348 A1 | 6/2002 | Tani | |
| 2006/0206730 A1 | 9/2006 | Cartes et al. | |
| 2007/0277046 A1 | 11/2007 | Yasuda et al. | |
| 2007/0300084 A1 | 12/2007 | Goodrum et al. | |
| 2007/0300085 A1 | 12/2007 | Goodrum et al. | |

* cited by examiner

Primary Examiner—Suresh K Suryawanshi
(74) Attorney, Agent, or Firm—Patentec; Kenneth Gural

(57) ABSTRACT

In a computer system having a power supply, processor, and additional subcomponents that are powered by the power supply, a method for estimating the total power requirements of the system under a variety of operating modes and configurations. In an exemplary embodiment, information concerning power requirements for each subcomponent under its operating modes is stored within non-volatile memory within the subcomponents. This information is accessed by the processor during the boot sequence, and if the information is not available, substitute information is provided. The compiled information is tabulated to compute the estimated total power requirement of the current hardware configuration. A display of this information, along with configuration selection rules, enables the user to select alternative operating modes and configurations and to show the resulting estimated power requirements.

1 Claim, 2 Drawing Sheets

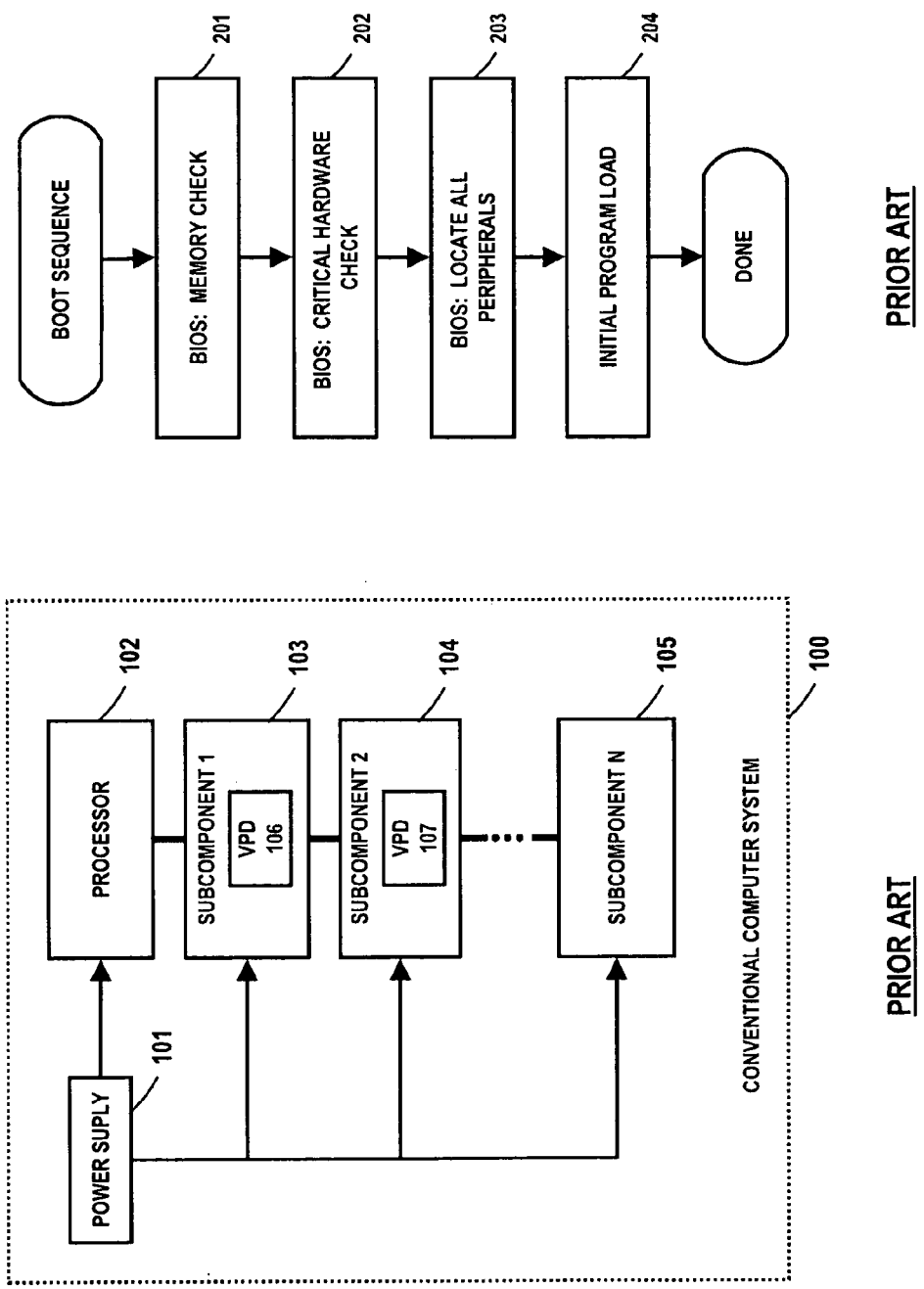
FIG. 2: TYPICAL BOOT SEQUENCE
PRIOR ART
FIG. 1: COMPUTER SYSTEM
PRIOR ART

| | Subcomponent | Qty | Max Power Budget for Quantity 1 | Derating Factor for Typical Workload | Effective Power | Percent of Total Power | Comments |
|---|---|---|---|---|---|---|---|
| 310 | Processor Module SCM 1-core 1.65 GHz | 0 | 136w | 90% | 0w | 0.00% | Select only 1 out of 4 proc features. |
| | Processor Module DCM 1-core 1.65 or 2.1 GHz | 0 | 149w | 90% | 0w | 0.00% | |
| | Processor Module DCM 2-core 1.65, 1.9 or 2.1 GHz | 0 | 183w | 90% | 0w | 0.00% | |
| | Processor Module QCM 4-core 1.65 GHz | 1 | 217w | 90% | 195w | 33.06% | |
| | Memory DDR2-528 DIMM 1 GB (8 max) | 0 | 11w | 60% | 0w | 0.00% | Can select up to 8 DIMM max of any combination. 2 minimum. |
| | Memory DDR2-528 DIMM 2 GB (8 max) | 0 | 11w | 60% | 0w | 0.00% | |
| | Memory DDR2-528 DIMM 4 GB (8 max) | 8 | 12w | 60% | 57w | 9.74% | |
| | System Planar | 1 | 100w | 70% | 70w | 11.86% | Always select 1. |
| | DASD Backplane | 2 | 1w | 70% | 2w | 0.27% | Can select up to 2 DASD backplanes. 1 minimum. |
| | Media Backplane | 1 | 0w | 70% | 0w | 0.03% | Always select 1 media backplane. |
| | DASD 3.5" 15 KRPM | 8 | 20w | 70% | 114w | 19.37% | Can select up to 4 drives per DASD backplane. 0 min & 8 max. |
| 311 | DASD 3.5" 10 KRPM | 0 | 17w | 70% | 0w | 0.00% | |
| | DVD | 2 | 8w | 70% | 11w | 1.94% | Can select up to 2 DVD. 1 minimum. |
| | Tape Drive VXA | 0 | 37w | 70% | 0w | 0.00% | 312 Select 0 or 1 out of 3 tape drives. |
| 315 | Tape Drive LTO | 0 | 30w | 70% | 0w | 0.00% | |
| | Tape Drive DAT160 | 0 | 19w | 70% | 0w | 0.00% | |
| | RAID card | 1 | 9w | 60% | 5w | 0.88% | Select 0 or 1. |
| | PCIX 64b slot 1 | 1 | 20w | 70% | 14w | 2.37% | Select 0 or 1 per PCI slot. 0 min & 6 max total. |
| | PCIX 32b slot 2 | 1 | 20w | 70% | 14w | 2.37% | |
| | PCIX 32b slot 3 | 1 | 20w | 70% | 14w | 2.37% | |
| | PCIX DDR slot 4 | 1 | 20w | 70% | 14w | 2.37% | |
| | PCIX 64b slot 5 | 1 | 20w | 70% | 14w | 2.37% | |
| | PCIX 64b slot 6 | 1 | 20w | 70% | 14w | 2.37% | |
| | Remote I/O RIOG Adapter | 1 | 15w | 70% | 10w | 1.77% | Select 0 or 1 out of 2 Remote I/O adapters. |
| | Remote I/O IB 4x Adapter | 0 | 17w | 70% | 0w | 0.00% | |
| 313 | Fan (92mm, system) | 3 | 8w | 60% | 14w | 2.44% | |
| | Total Power Supply DC Output Power | | | | 590w | 100.00% | 320 |
| | Power Supply Efficiency | | | | 85% | | |
| | Power Factor | | | | 97% | | |
| | Total Power Supply AC Input Power | | | | 715w | | 314 |
| | Measured Power Supply AC Input Power | | | | | | |
| | Power Supply Output Rating | | | | 850w | | 321 |
| | Power Supply AC Input Rating | | | | 1031w | | 322 |

FIG. 3

METHOD FOR ESTIMATING TOTAL POWER REQUIREMENT IN A COMPUTER SYSTEM

BACKGROUND OF THE INVENTION

1. Field of the Invention

The present invention relates generally to computer systems containing a power supply and a plurality of other subcomponents, and more particularly, to a method for automatically determining the total power requirement for the power supply based on the power requirements for each of the subcomponents, under a variety of operating modes and configurations.

2. Description of the Related Art

Present-day computer systems, such as desktop PCs and laptop computers, commonly have an architecture shown schematically in FIG. 1, comprising a power supply 101, processor 102 and additional subcomponents 103-105 such as RAM, hard disk drives, DVD drives, I/O ports, etc., that may be easily added or removed from the system. Some or all of these subcomponents (shown here, for example, with respect to subcomponents 103 and 104 but not 105) typically include a non-volatile memory containing vital product data (VPD) 106 and 107 relating to configuration parameters for the subcomponent. For example, a hard disk drive may contain information in the VPD memory indicating the number of cylinders, the number of heads, and the storage size of each cylinder.

Power supply 101 converts electrical energy from a source of energy (e.g., line current or a battery, not shown) into the various voltages and currents necessary to run the subcomponents of the computer system. For each subcomponent to function properly, that subcomponent must receive a required amount of power from the power supply. This amount of power may vary during the operation of the subcomponent—for example, a hard disk drive will need more power when the disk is accelerating than when it is constantly rotating or at rest. In addition, the subcomponents may operate under diverse operating modes. For example, it may be possible to select the operating speed of the processor, which usually affects the power consumed by the processor. The system may also support processors having different operating characteristics. For each of the possible operating modes of a particular subcomponent, it is usually possible to define the maximum power consumed by that subcomponent when operating in that mode, and also the average power required under normal usage. The total power required of the power supply must then be at least as great as the total of the average power requirements for each subcomponent in a particular set of operating modes.

When choosing the proper power supply for a particular computer system, it is therefore important to know the power requirements for each of the subcomponents in its various operating modes, based on a particular configuration. This information is usually obtained by observing a printed label on each subcomponent or by reference to specification manuals. Once the power requirements are known, the total power requirement may be computed, and the size of the power supply can then be chosen to equal or exceed this amount. Since at a later date, it may become necessary to modify the hardware configuration of the computer system to include additional subcomponents beyond those originally installed, and in order to avoid at that time replacing the power supply with a larger one, it is usually prudent to choose the power supply that is initially installed in the computer system to exceed the original power requirements by a sufficient margin to accommodate any future anticipated subcomponent expansion.

It should be appreciated that the subcomponents in present-day computer systems can include a large variety of operating modes and associated power requirements that can vary from one manufacturer to another and from one product series to another. For example, the amount of power used by the memory modules will depend on the technology used to fabricate the modules, the storage capacity of the modules, as a function of the selected clocking speeds. Because of the large number of parameters and circumstances controlling the power requirements for the subcomponents, keeping track of all of the power requirements for all of the subcomponents in all of their modes in a dynamic market where products change daily can be extremely difficult for the installer. Further, when subcomponents are changed or added to a computer system at a later date, it is necessary for the user to recompute the total power requirements in order to make sure that the power supply currently installed will be adequate. Determining the total power requirements may be difficult for the user to do, because the power information may be placed on labels that are currently inaccessible within the system, or are covered by other modules and therefore require disassembly of portions of the computer system, or are unavailable because the necessary specification manuals are unavailable.

Therefore, a need exists to quickly and easily determine the total power requirements of a computer system under a variety of operating modes and configurations.

SUMMARY OF THE INVENTION

In an exemplary embodiment of the present invention, information concerning power requirements for each subcomponent under a variety of its operating modes is stored within non-volatile memory units on the various subcomponents. This information is read by the processor during the boot sequence, missing information is substituted, and the result tabulated to compute the estimated power requirement of the current hardware configuration. A display of this information may include configuration selection rules, thereby facilitating the user in selecting alternative operating modes and configurations.

BRIEF DESCRIPTION OF THE DRAWINGS

While the extent of the invention is limited only by the scope of the appended claims, the principles of the present invention and further objectives and advantages thereof may best be understood by the exemplary embodiments which are set forth in the following detailed description and accompanying drawings, wherein:

FIG. 1 is a schematic representation of a conventional computer system, showing some subcomponents containing VPD memory;

FIG. 2 is a flow chart showing a typical boot sequence;

FIG. 3 is a display exhibiting the estimated power requirements for a typical mode of operation and configuration.

DETAILED DESCRIPTION OF THE INVENTION

The conventional computer system illustrated in FIG. 1, when started from power off, typically follows a firmware "boot sequence" as shown in FIG. 2, including a BIOS portion of code during which time the computer's processor performs various diagnostic routines 201, 202 to check proper operation of other subcomponents. The processor also queries the subcomponents 203 to determine which ones are present and may query jumper settings (not shown) or VPD memories 106, 107, if they are present in the subcomponent, to determine operating parameters. The processor then begins to load the main operating system from the hard drive 204 during the initial program load (IPL) portion of code.

In an exemplary embodiment of the present invention, the VPD for each subcomponent is expanded to include information pertaining to the subcomponent's power requirements under each possible operating mode. For example, the stored information may include the maximum power used by the subcomponent, the percentage of maximum power used under typical workloads, and/or the average power used, as a function of selected clocking speed. Then, during the boot sequence, either during steps 203 and 204 or other point during the process, the processor queries the VPDs for each subcomponent and tabulates a list of their power requirements. For those cases where a plurality of operating modes or configurations are included in the VPD power information, the power requirements for all of the modes and configurations for that subcomponent are retrieved by the processor, and retained for use in the tabulation.

In the event a subcomponent is missing power information or does not have a VPD memory, the processor firmware or the operating system information may be pre-programmed with data allowing it to use an approximate value for the expected power requirements for that subcomponent. For example, the processor may be pre-programmed with the information that an average hard disk drive needs approximately 20 W (Watts) of power, including regulator efficiency loss and power distribution loss. This allows the processor to make more accurate estimates of the total power requirements in those cases where the VPD data is not available.

After querying all of the subcomponents, and substituting any missing information with approximate information, the processor can tally the total power requirements and present the information to the user. A typical user display is shown in FIG. 3. Each of the subcomponents, or possible other operating modes and configurations, is listed in the first column 301. The quantity of the subcomponents installed and operating in a particular mode is shown in the second column 302, or zero is listed if none of the subcomponents are currently operating in that mode. The maximum power budget is shown in the third column 303, and the derating factor for typical workload is shown in the fourth column 304. This yields the effective power in column five 305. The percentage of the total power employed by this subcomponent or configuration is shown in column six 306. The last column 307 includes configuration selection rules to aid the user in choosing the desired operating mode or configuration.

As an example of the way the information is displayed in this chart, lines 310 indicate the power requirements associated with the choice of processor. In this case, a processor module QCM 4-core 1.65 GHz is installed having a maximum power requirement of 217 W (including regulator efficiency loss and power distribution loss) and a typical average usage of 90%, making the effective average power 195 W. Other possible processor configurations/speeds are also shown. The computer system also includes two DVDs 311, shown as having maximum power of 8 W each and percentage of average usage of 70%, thereby yielding an average power requirement 312 for the two DVDs combined of 11 W. The fans 313 (quantity 3) are shown as having maximum power requirement of 8 W each and a 60% average derating factor, yielding an average power of 4.8 W for each, or for all of the fans, a total effective power 314 of 14 W, which in this case is 2.44% of the total power requirements for this computer system.

After tallying the average power requirements for all of the subcomponents in the sample configuration, the processor determines 320 for this example that the total power requirement is 590 W. Assuming a typical power supply efficiency of 85% and a typical power factor of 97%, this means that the present system configuration requires a power supply capable of delivering 715 W of power 321.

Since the power supply itself is a subcomponent of the present computer system, it may include a VPD memory and have its power capabilities stored therein. These capabilities may be accessed by the processor and displayed in the chart for comparison. The output power rating for the installed power supply in the present example is shown 322 as 850 W, and its input power 323 is 1031 W. In both cases, this exceeds the computed total power requirement of 590 W and 715 W respectively. So this analysis indicates that the installed power supply has sufficient capacity to handle the present load of the subcomponents.

By displaying a plurality of alternative subcomponents and their operating modes and configurations within the chart, along with configuration selection rules, and allowing the user to select the quantity and types of these operating modes, this invention in an exemplary embodiment allows the user to easily determine the effect upon the total power requirement that would be caused by adopting any of the alternative valid operating modes or configurations. For example, the user may consider changing the processor, by reducing the quantity of "Processor Module QCM 4-core 1.65 GHz" to zero and incrementing the quantity of another processor to one. The computer then recalculates the total power and redisplays the information to the user. In the event the user fails to follow the configuration selection rules properly, for example by selecting two processors when only one is allowed, the computer may generate an error message alerting the user to the discrepancy.

The processor according to another embodiment of the present invention may obtain information for subcomponents that are not presently installed in the system, such as tape drives 314, to enable the user to consider the effect of adding those components. The additional power information for the currently uninstalled subcomponents may be held in firmware, or as part of the operating system files on the hard disk drive, or may be downloaded from an external location (e.g., through the internet) as necessary.

As an alternative to using the stored maximum and/or average power information for the various subcomponents, another embodiment of the present invention uses an actual power measurement of at least one subcomponent for computing the current power load, which measurement may be obtained by any suitable circuitry as is well-known in the art. This measurement information may be combined with the static information retrieved from the same or other subcomponents, or from firmware or operating system information, or externally, as previously described.

In summary, the present invention provides an effective way to quickly estimate the total power requirement for a computer system, despite frequent hardware changes, loss of specification manuals, inaccessible subcomponent labels, etc., and under a wide variety of operating modes and configurations.

The foregoing description of the invention has been provided for the purpose of illustrating the basic principles of the invention, and is not intended to be exhaustive or limiting of all possible variations of the invention that will be readily evident to those of ordinary skill in the art, in the light of the teachings found herein. For example, although the invention is described as occurring during the boot sequence, it could equally be performed at any time during the operation of the computer. Furthermore, the power information may be stored in other locations than the already-described VPD, firmware, operating system data, or external source, for example, in other areas of the hard drive. Further, the power information may be presented to the user not only in a chart format, but also using a suitable GUI control panel format, and/or may be used to generate a visual error message or auditory signal (e.g., beep) in the event it is estimated that the total computed power requirement is greater than the rated capacity of the installed power supply. The computer system may also include multiple power supplies, so that the tally of the total available power would be a sum of the individual power available from each power supply. Accordingly, the invention should not be limited by the exemplary embodiments described herein, but only by the spirit and scope of the appended claims.

What is claimed is:

1. In a computer system having at least one processor and a plurality of other subcomponents, each subcomponent operational under one or a plurality of operating modes and configurations, and wherein at least one of said subcomponents contains a non-volatile memory storing power information relating to power requirements for said subcomponent under each of said operating modes and configurations, the method for automatically determining an estimated total power requirement for said computer system under existing and alternative operating modes and configurations, comprising:

polling each of said subcomponents to access any power information contained therein, and in the event that said power information is not available from said subcomponent, substituting power information therefor;

compiling a table listing the power information for each of said subcomponents under each of said operating modes and configurations associated therewith, and including within said table, for each operating mode and configuration, the quantity of subcomponents currently in said operating mode and configuration;

computing the total power requirement for said computer system by summing the power requirements for each of the operating modes and configurations in said table multiplied by the quantity of subcomponents in said operating mode and configuration;

accepting input from a user to change the quantity of subcomponents for at least one operating mode or configuration listed in said table, and recomputing the total power requirement responsive to the changed quantity;

whereby the user may easily determine the existing estimated total power for the system and the effect on the total power resulting from said changed quantity.

\* \* \* \* \*